Patented Oct. 14, 1941

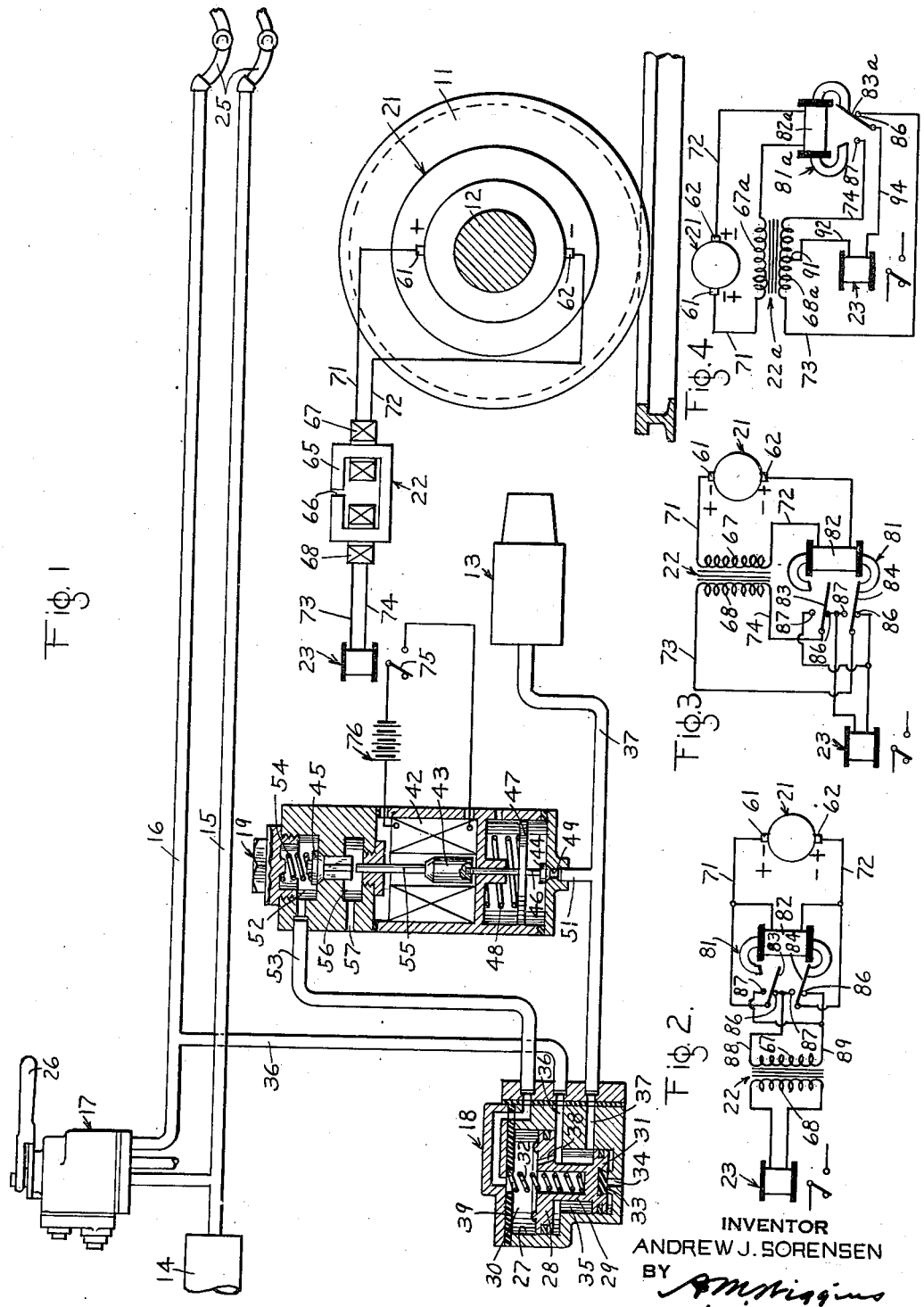

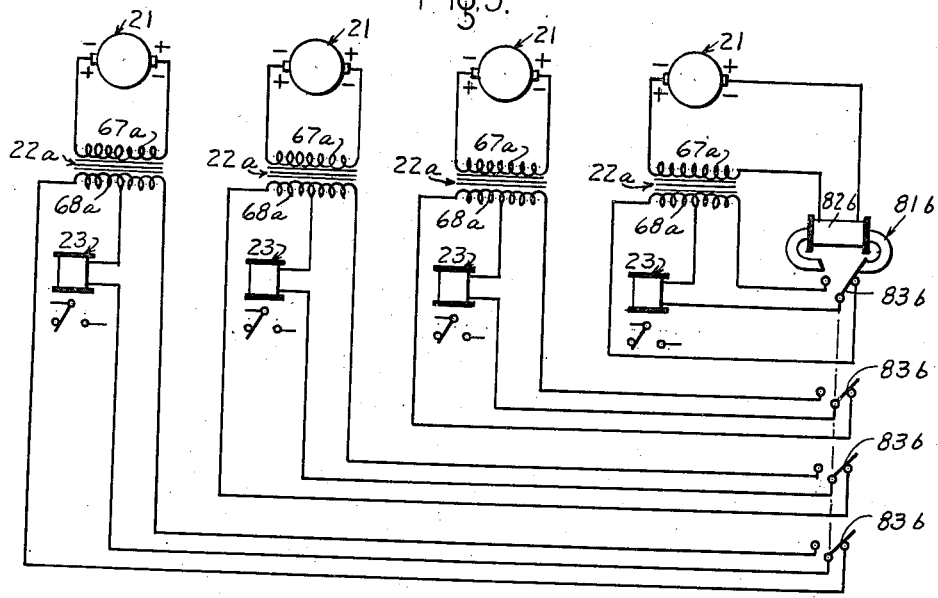
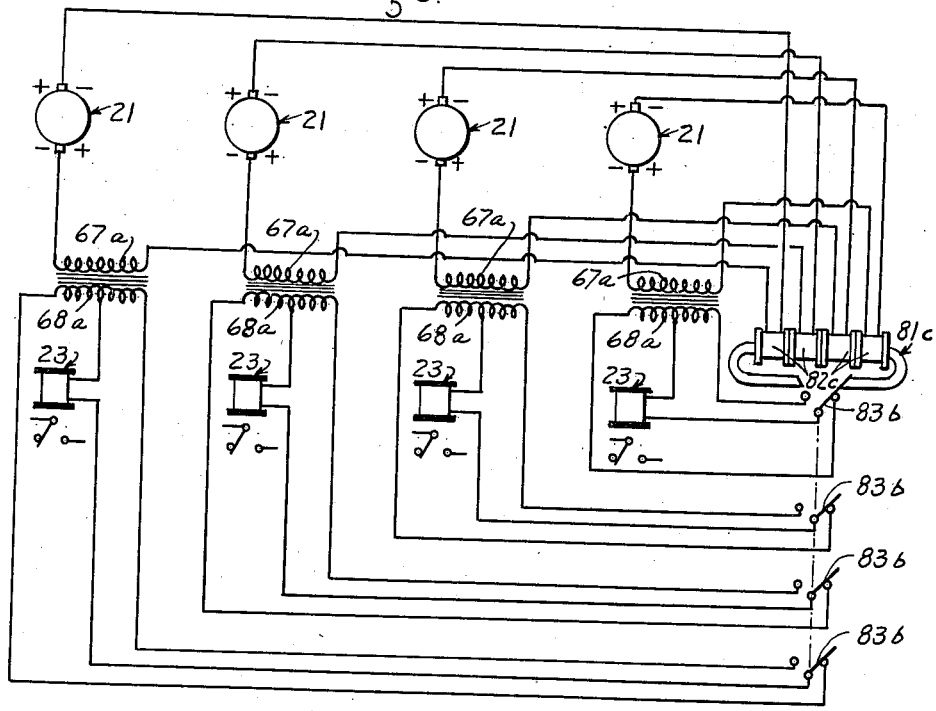

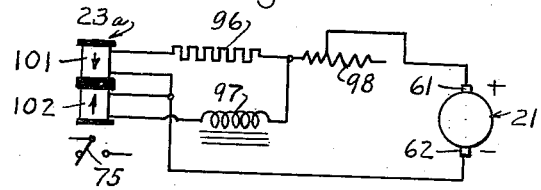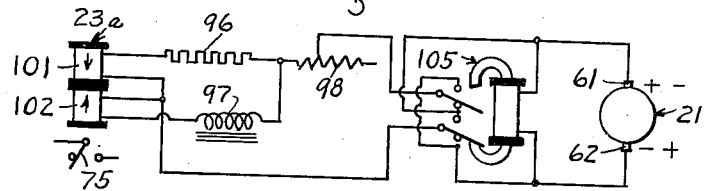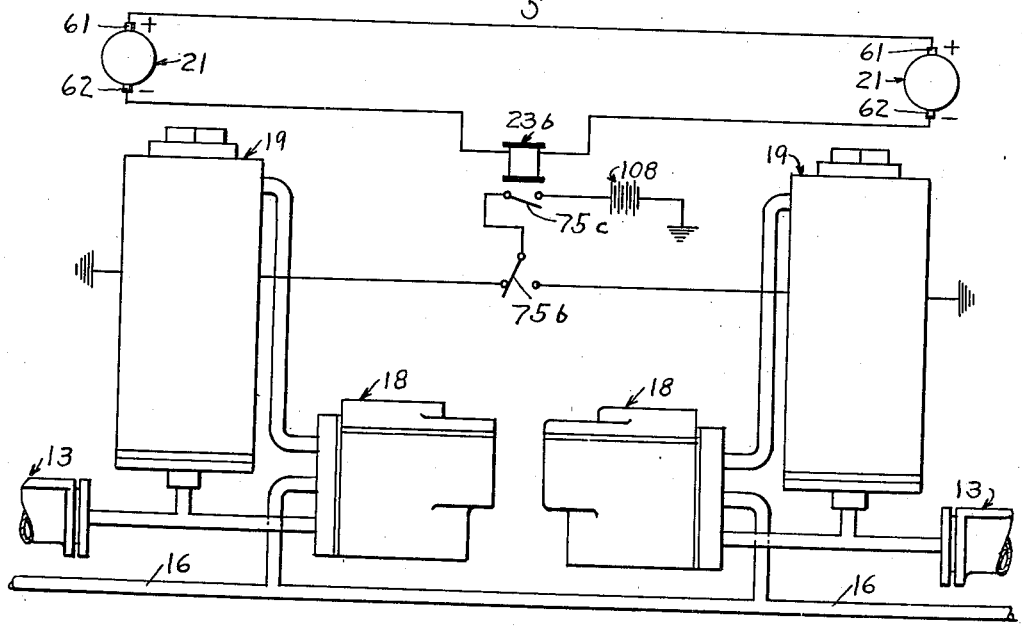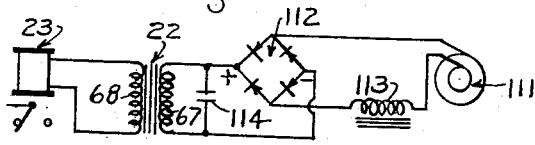

2,258,820

UNITED STATES PATENT OFFICE 2,258,820

BRAKE CONTROL MEANS

Andrew J. Sorensen, Pittsburgh, Pa., assignor to The Westinghouse Air Brake Company, Wilmerding, Pa., a corporation of Pennsylvania Application September 29, 1939, Serial No. 297,103

26 Claims. (Cl. 303—21)

This invention relates to brake control means for the wheels of vehicles such as railway cars and trains and has particular relation to that type of brake control means which is automatically effective, when a vehicle wheel begins to slip, to cause prompt and rapid release of the brakes associated with the wheel to prevent the sliding thereof.

As is well known, when the brakes associated with a vehicle wheel are applied with sufficient force to overcome the adhesion or static friction between the wheel and the road surface or rail on which it rolls, the wheel rapidly decelerates to a locked or non-rotative state and slides. It is also known and has been demonstrated that if the brakes are promptly and rapidly reduced a sufficient amount at the instant the car wheel begins to slip, that is, decelerate toward a locked condition, the wheel ceases to decelerate and begins to accelerate back toward a speed of rotation corresponding to the speed of the vehicle without actually reaching the non-rotative or sliding condition.

In the subsequent description of my invention, it will be understood that the term "sliding" refers only to the dragging of a car wheel along the road surface or rail in a locked or non-rotative state. The rotation of a vehicle wheel at a speed less than that corresponding to the vehicle speed at the same instant is referred to as "slip" or a "slipping" condition. The distinction between the terms "slide" and "slip" should accordingly be borne in mind.

When a vehicle wheel begins to slip, the time interval that elapses before it reaches a locked or non-rotative state, assuming no release of the brakes, may be of the order of one second. It is imperative, therefore, that the brakes on a vehicle or car wheel be instantly and rapidly released at the time slipping begins in order to prevent the wheel from decelerating to a locked or non-rotative state. Various arrangements have been proposed, including mechanical devices of the rotary inertia type responsive to the rate of deceleration and acceleration of a vehicle wheel, for controlling the release of the brakes and subsequent reapplication thereof. Such mechanical devices present certain difficulties particularly as to the mounting thereof and the extraordinary accuracy required in the construction thereof to make such devices sufficiently sensitive and yet sturdy enough to withstand the severe shocks and jars sustained in service, particularly railway service.

It is accordingly an object of my invention to provide apparatus for controlling vehicle wheel brakes in a manner to prevent the locking or sliding thereof, which apparatus obviates some of the problems and difficulties of prior known devices.

More specifically, it is an object of my invention to provide electrical apparatus associated with a vehicle wheel or pair of wheels which is adapted to recognize abnormal or other predetermined rotative conditions of the vehicle wheel, such as a slipping condition.

It is another object of my invention to provide electrical apparatus of the type indicated in the foregoing objects which is adapted to function for either direction of rotation of the vehicle wheel.

The above objects, and other objects of my invention which will be made apparent in the subsequent description, are attained by a number of illustrative embodiments shown in the accompanying drawings, wherein Fig. 1 is a simplified diagrammatic view, showing a brake control apparatus embodying my invention, Figs. 2 and 3 are fragmental diagrammatic views, illustrating respectively two modified arrangements of the electrical apparatus shown in Fig. 1 which are effective at all times notwithstanding a reversal of rotation of the vehicle wheel, Fig. 4 is a diagrammatic view, showing another modification of the electrical apparatus shown in Fig. 1 which is effective for either direction of rotation of the vehicle wheel, Figs. 5 and 6 are diagrammatic views, illustrating respectively two different methods of employing the electrical apparatus of Fig. 4 in connection with a plurality of wheels or wheel-and-axle units, as for example, the wheel and axle units of an entire railway car, Fig. 7 is a diagrammatic view, showing a further modification of the electrical apparatus shown in Fig. 1, Fig. 8 is a diagrammatic view, illustrating the manner in which the electrical apparatus shown in Fig. 7 may be effective for rotation of the vehicle wheel in opposite directions, Fig. 9 is a fragmental diagrammatic view, illustrating another embodiment of my invention adapted to selectively control the brakes associated with a pair of adjacent wheel or wheel-and-axle units, and Fig. 10 is a fragmental diagrammatic view, illustrating another type of electrical apparatus adapted to function for either direction of rotation of a vehicle wheel in connection with the brake control apparatus shown in Fig. 1.

*Embodiment shown in Fig. 1*

Referring to Fig. 1, there is shown, in simplified form, brake control apparatus associated with a single wheel-and-axle unit of a railway car in which two car wheels 11, only one of which is shown, are fixed at opposite ends of a connecting axle 12. The brake control apparatus shown comprises a brake cylinder 13 for effecting operation of the brakes associated with the vehicle wheels, 11, a source of fluid pressure supply such as a reservoir 14, a pair of conduits or pipes, hereinafter referred to respectively as the supply pipe 15 and the control pipe 16, a manually operative self-lapping brake valve 17 for controlling the pressure in the control pipe 16, a brake release valve device 18 associated with the brake cylinder 13, and a magnet valve device 19 for controlling the operation of the brake release valve device 18.

According to my invention, electrical apparatus, including a generator 21 associated with the wheels 11, a voltage-translating device or transformer 22 and a relay 23, is provided for registering a slipping condition of the wheels 11 and controlling the energizing circuit of the magnet valve device 19.

Considering the parts of the equipment in greater detail, the brake cylinder 13 is of conventional construction and is adapted upon the supply of fluid under pressure thereto to effect application of brakes on the car wheels 11, and upon release of fluid under pressure therefrom to effect release of the brakes.

As will more fully appear hereinafter, the pressure established in the brake cylinder corresponds to the pressure established in the control pipe 16. The control pipe 16 is normally at atmospheric pressure and is charged to a desired pressure above atmospheric pressure by operation of the brake valve device 17, fluid under pressure being supplied to the control pipe 16 from the supply pipe 15 which is constantly connected to the reservoir 14 and charged to the normal pressure carried therein, for example, one hundred pounds per square inch.

It will be understood that in the application of my invention to a train brake equipment, the supply pipe 15 and the control pipe 16 will extend throughout all cars of the train in the usual manner of train pipes, the different sections of the pipes on successive cars being connected by flexible hose connectors 25 between the cars.

Brake valve device 17 is of the self-lapping type described in detail and claimed in Patent No. 2,042,112 of Ewing K. Lynn and Rankin J. Bush and accordingly a functional description thereof is deemed sufficient for the purposes of the present invention. When the operating handle 26 of the brake valve device is in its normal release position, the valve mechanism of the brake valve device is conditioned to vent the control pipe 16 to atmosphere. When the handle 26 is shifted horizontally out of its normal release position into a so-called application zone, the valve mechanism of the brake valve device is first operated to establish communication through which fluid under pressure is supplied from the supply pipe 15 to the control pipe 16 and there automatically operated to a lap position when a pressure is established in the control pipe 16 that is substantially proportional to the displacement of the operating handle 26 out of its normal release position.

Should the pressure in the control pipe 16 tend to reduce, due to leakage or other causes, from a pressure corresponding to the position of the handle 26, the valve mechanism of the brake valve device is automatically effective to cause fluid under pressure to be supplied to the control pipe to restore and maintain a pressure therein corresponding to the position of the handle 26. In this connection, it should be borne in mind that in the case of a train brake equipment, the operator exercises control of the brakes on all wheel-and-axle units of the different cars of the train by means of the brake valve device 17 and the control pipe 16.

The brake release valve device 18 is of wellknown construction, being a standard type of valve device employed in railway fluid pressure brake apparatus. It is effective under normal conditions to provide a communication through which fluid under pressure is supplied from control pipe 16 to the brake cylinder 13 and is effective upon operation to cut off the brake cylinder from the control pipe and vent fluid under pressure from the brake cylinder. Briefly, the brake release valve device 18 comprises a suitable casing having a circular bore 27 in which an annular piston 28 operates. The piston 28 is provided with a hollow stem 29 that is open to a chamber 30 at the upper side of the piston and closed at the end thereof. Formed on the closed end of the stem 29 is a piston valve 31.

Interposed between the closed end of the hollow piston stem 29 and a movable cover portion of the casing closing the open end of the bore 27 is a spring 32 that yieldingly urges the piston downwardly to effect seating engagement of the piston valve 31 on an annular seat rib 33 which surrounds an exhaust port 34. In this position of the piston 28, the annular chamber 35 formed between the piston valve 31 and the piston 28 connects two ports or passages 36 and 37 which are connected by corresponding pipes 36 and 37, respectively, to the control pipe 16 and brake cylinder 13.

The piston 28 is provided with a restricted port 38 of such flow area that when fluid under pressure is supplied to the annular chamber 35 through the pipe 36 from the control pipe 16, it flows rapidly enough through the port to the chamber 30 at the upper side of the piston that the spring 32 maintains the piston valve 31 seated on the annular seat rib.

If, while the chamber 30 is charged with fluid under pressure, fluid under pressure is rapidly vented therefrom, the port 38 in the piston so restricts the flow of fluid under pressure from the annular chamber 35 to the chamber 30 that the pressure of the fluid in the annular chamber 35, acting on the lower side of the piston 28, becomes sufficiently higher than that in chamber 30 to overcome the spring 32 and shift the piston 28 upwardly into seated relation on an annular gasket seat 39 at the upper end of the bore 27. In this position of the piston 28, the piston valve 31 is shifted upwardly out of contact with the annular seat rib 33 to a point between the two passages 36 and 37. Thus the communication between the pipe 36 and the pipe 37 is closed and at the same time the pipe 37 is connected to atmosphere through the exhaust port 34.

As long as the inner seated area of the piston 28, while seated on the gasket 39, is maintained at atmospheric pressure, the pressure acting on the lower side of the piston is sufficient to maintain the piston seated on the gasket seat 39, the fluid under pressure released to atmosphere through the restricted port 38 being of negligible quantity.

The reduction of the pressure in the chamber 30 is effected by the magnet valve device 19. Magnet valve device 19 is of the type described in detail in the copending application, Serial No. 309,648, of Clyde C. Farmer, filed May 24, 1938, now Patent No. 2,198,029, issued April 23, 1940, and is in itself not my invention.

The magnet valve device 19 comprises a suitable sectionalized casing embodying therein an electromagnet winding or solenoid 42 having an associated plunger 43 for operating two valves 44 and 45 of the poppet type.

The valve 44 is fixed on a stem 46 that is secured, as by screw-threads thereon, to the plunger 43. The stem 46 of the valve 44 carries in fixed relation thereon a piston 47 that operates in a suitable bore in the casing. A coil spring 48 interposed between the piston 47 and a wall of the casing yieldingly urges the piston downwardly to effect seating of the valve 44 on an associated valve seat surrounding a port 49 that is constantly connected by a branch pipe 51 to the pipe 37 leading to the brake cylinder 13.

Spring 48 is so designed in relation to the area of the valve 44 subject to the brake cylinder pressure in the pipe 37 as to normally maintain the valve 44 seated against such pressure. When the electromagnet winding 42 is energized, however, the upward magnetic force exerted on the plunger 43 is sufficient to overcome the spring 48 and shift the piston 47 and valve 44 upwardly, thus unseating the valve 44. With the valve 44 unseated, the pressure of the fluid in the brake cylinder is effective on the lower face of the piston 47. The area of the piston 47 is so much greater in comparison to the area of the valve 44 that the brake cylinder pressure acting over the greater area of the piston 44 is sufficient to maintain the piston and valve 44 in the upper position thereof against the force of the spring 48 as long as the pressure in the brake cylinder exceeds a certain low value, such as five or ten pounds per square inch.

The valve 45 is contained in a chamber 52 that is constantly connected by a pipe and passage 53 to the chamber 30 at the upper side of the piston 28 of the brake release valve device 18. The valve 45 is normally yieldingly urged into seated relation on an associated valve seat by a coil spring 54. When the plunger 43 is shifted upwardly from the normal position thereof shown, a stem 55 at the upper end of the plunger 43 engages the lower end of the fluted stem of the valve 45 and unseats the valve 45. With the valve 45 unseated, communication is established past the valve between the chamber 52 and a chamber 56 that is constantly open to atmosphere through an exhaust port 57.

It will thus be seen that when the electromagnet winding 42 of the magnet valve device 19 is energized, fluid under pressure in chamber 30 of the brake release valve device 18 is instantly and rapidly vented to atmosphere through the exhaust port 57 of the magnet valve device 19. It will also be seen that due to the unseating of the valve 44 and the consequent upwardly exerted fluid pressure on the lower face of the piston 47, the valve 45 is maintained unseated so as to maintain the chamber 30 of the brake release valve device 18 vented until the pressure in the brake cylinder 13 is reduced below the certain low value of 5 or 10 pounds per square inch through exhaust port 34 of the brake release valve 18. The reason for this operation will be made apparent hereinafter.

The generator 21 is illustrated diagrammatically as of the direct-current type and it will be understood is so designed that the voltage at the brush terminals 61 and 62 thereof is at all times substantially proportional to the speed of rotation of the pair of connected car wheels 11. The generator 21 may be driven in any suitable manner according to the speed of rotation of the wheel axle 12 or of a car wheel 11. For simplicity, it is shown to be mounted directly on the axle 12, with the axle serving as the generator armature shaft, in a manner similar to the mounting arrangement of certain types of traction motors for street railway cars.

The transformer 22 is indicated, in partly diagrammatic form, as comprising a suitable rectangular magnetic core of laminated construction having an air gap 66 therein and two electromagnet windings, hereinafter referred to as the primary winding 67 and the secondary winding 68, arranged in conventional manner on the core 65. The primary winding 67 is connected by two wires 71 and 72 to the brush terminals 61 and 62 respectively of the generator 21 and is thus energized in accordance with the voltage at the brush terminals 61 and 62.

The secondary winding 68 is connected by a pair of wires 73 and 74 to the opposite terminals of the magnet winding of relay 23. Relay 23 is of a polarized type and has a contact member 75 which is normally biased to a circuit-open position and which is operated to a circuit-closing position only when the current flows in one certain direction through the winding of the relay 23 and exceeds a certain value.

As will be apparent without description, the relay 23 controls a simple circuit for energizing the magnet winding 42 of the magnet valve device 19 in which circuit is included a suitable source of direct-current, such as a storage battery 76.

*Operation*

Assuming that the reservoir 14 is charged to the normal pressure carried therein, as from a fluid compressor, not shown, so that the supply pipe 15 is likewise charged, and assuming further that the vehicle is traveling along the road under power or coasting with the brake valve handle 26 in its release position so that the brakes are released, the operator may effect an application of the brakes by first shutting off the propulsion power, if the power is on, and then shifting the brake valve handle 26 into the application zone an amount corresponding to the desired degree of application of the brakes. The control pipe 16 is accordingly charged to a pressure corresponding to the position of the brake valve handle in the application zone. Fluid under pressure thus flows from pipe 16 through the branch pipe 36, annular chamber 35 of the brake release valve device 18 and pipe and passage 37 to the brake cylinder 13, which accordingly effects application of the brakes in accordance with the pressure established in the control pipe 16.

Assuming that the wheels 11 do not slip in response to the application of the brakes, the brake release valve device 18 remains conditioned as shown throughout the application of the brakes. Thus, in order to release the brakes the operator merely returns the brake valve handle 26 to its normal release position. Fluid under pressure is accordingly exhausted from the brake cylinder to atmosphere through the pipe and passage 37, chamber 35 of brake release of the valve device 18, passage and pipe 36, control pipe 16, and the exhaust port of the brake valve device 17, thereby releasing the brakes.

If the degree of application of the brakes is sufficient to cause slipping of the wheels 11, a different and further operation occurs which will now be described. Assuming that the wheels 11 begin to slip, the voltage across the brush terminals 61 and 62 of the generator 21 associated with the wheels 11 correspondingly reduces. Transformer 22 is so designed that when the voltage impressed on the primary winding 67 changes at a rate in excess of a certain rate occurring only when the wheel slips, the voltage induced in the secondary winding 68 of the transformer is such as to cause flow of current in the proper amount and direction to cause operation of the contact member 75 of the relay 23 to its circuit-closed position.

The magnetic core 65 of the transformer 22 is provided with the air gap 66 to prevent saturation of the core and thus cause variation of the magnetic flux in the core substantially in proportion to the variation of the voltage impressed on the primary winding. Accordingly, regardless of the speed of travel of the vehicle, the rate of change of flux in the core 65 occurring as a result of slipping of the wheels 11 is always such as to cause sufficient voltage to be induced in the secondary winding to cause operation of the relay contact 75 to its circuit-closed position.

It will be apparent, therefore, that as long as the wheels 11 do not slip, the rate of rotative deceleration of the wheels and consequently the rate of reduction of the voltage impressed on the primary winding 67 will be insufficient to cause a voltage to be induced in the secondary winding 68 high enough to operatively energize the relay 23.

With the contact member 75 of relay 23 in its circuit-closed position, the magnet winding 42 of the magnet valve device 19 is energized and as a result the chamber 30 at the upper side of the piston 28 of the brake release valve device 18 is vented to atmosphere. The piston valve 31 of the brake release valve device 18 is accordingly operated to cut off the supply of fluid under pressure from the control pipe 16 to the brake cylinder and at the same time cause fluid under pressure to be vented from the brake cylinder to atmosphere through the exhaust port 34 at a rapid rate.

Due to the rapid reduction of the pressure in the brake cylinder 13 as just described and the consequent rapid release of the brakes on the wheels 11, the rate of rotative deceleration of the wheels promptly and rapidly decreases and then after passing through a theoretical instant of constant speed begins to accelerate back toward a speed corresponding to the speed of the vehicle.

When the rate of rotative deceleration of the vehicle wheels decreases below a point sufficient to cause a voltage to be induced in the secondary winding 68 of the transformer 22 high enough to operatively energize the relay 23, the contact member 75 is restored to its circuit-open position due to the biasing force exerted thereon and the circuit of the magnet winding 42 of the magnet valve device 19 is correspondingly interrupted.

Such deenergization of the magnet winding 42 is without immediate effect, however, because the brake cylinder pressure acting on the lower face of the piston 47 of the magnet valve device 19 is still sufficiently high to maintain the valve 45 unseated independently of energization of the magnet winding 42. Accordingly, the brake release valve device 18 remains conditioned so as to continue the exhaust of fluid under pressure from the brake cylinder 18 notwithstanding the return of the contact member 75 of relay 23 to its circuit-open position.

When the vehicle wheel accelerates back toward a speed corresponding to vehicle speed, the rate of acceleration thereof is at least as great in value as the rate of deceleration at the beginning of the wheel slip condition. The contact member 75 of relay 23 remains in its circuit-open position during the acceleration of the vehicle wheels back toward a speed corresponding to vehicle speed, however, because of the fact that the voltage impressed on the primary winding is now increasing instead of decreasing, with the result that the polarity of the voltage induced in the secondary winding 68 and consequently the flow of current through the magnet winding of the relay 23 is reversed. Due to the fact that the relay 23 is of the polarized type, as previously stated, the contact member 75 of the relay is therefore not operated out of its normal circuit-open position notwithstanding the fact that the value of the current flowing through the magnet winding would otherwise be sufficient to cause operation of the contact members to its circuit-closed position.

The interval of time that elapses between the time that the wheels begin to slip and the time that they are fully restored again to a rotative speed corresponding to vehicle speed is such in relation to the time required for the pressure in the brake cylinder 13 to reduce below the value of five or ten pounds per square inch sufficient to permit the spring 48 of the magnet valve device 19 to reseat the valves 44 and 45, that such reduction of the pressure in the brake cylinder is not effected until after the wheels have been fully restored to a speed corresponding to vehicle speed.

When the pressure in the brake cylinder 13 is reduced below the certain low value of five or ten pounds per square inch, the spring 48 of the magnet valve device 19 becomes effective to reseat the valves 44 and 45. Upon reseating of the valve 45, the exhaust communication for the chamber 30 of the brake release valve device 18 is closed and consequently, due to the prompt equalization of the fluid pressure in the chambers 35 and 30 through the restricted port 38 in the piston 28, the spring 32 becomes promptly effective to shift the piston downwardly and thus effect seating the piston valve 31 on the annular seat rib 33. The exhaust of fluid under pressure from the brake cylinder is thus stopped and the supply communication between the control pipe 16 and the brake cylinder 13 is reestablished. Fluid under pressure is thus resupplied to the brake cylinder to effect the reapplication of the brakes on the wheels that previously slipped.

Such resupply of fluid under pressure to the brake cylinder 13 tends to cause a reduction of the pressure in the control pipe 16 but, due to the pressure-maintaining feature of the brake valve device 17, the pressure in the control pipe is maintained automatically at the pressure corresponding to the position of the brake valve handle 26.

Due to the fact that the magnet valve device 19 is so controlled as to prevent the reapplication of the brakes before the slipping wheel returns fully to a speed corresponding to vehicle speed, the possibility of recurrence of slipping of the wheels is minimized.

Should the wheels 11 again begin to slip upon reapplication of the brakes, the apparatus again functions in the manner just described to effect the release of the brakes and the subsequent reapplication thereof so that at no time are the vehicle wheels permitted to attain a locked or sliding condition.

When a car train comes to a complete stop following an application of the brakes during which slipping of one or more of the wheels occurred, the brake release valve device 18 is ultimately always restored to the normal condition shown in which the fluid pressure communication between the control pipe 16 and the brake cylinder 13 is restored. Thus the release of the brakes may be effected prior to again starting the car or train by returning the brake valve handle 26 to its normal release position as previously described.

*Figs. 2 and 3*

The brake control apparatus shown in Fig. 1 is effective for only one direction of rotation of the vehicle wheels 11, that is, for travel of the vehicle only in a forward direction. In certain instances, such as modern high-speed trains of the articulated type in which the cars always travel in the same direction for forward travel of the train, the apparatus shown in Fig. 1 is suitable. However, if the brake control apparatus is employed in connection with railway passenger cars of the conventional non-articulated type adapted to travel in either direction it is necessary to modify the arrangement shown in Fig. 1 so as to insure the uni-directional flow of current through the winding of the relay 23 notwithstanding reversal of the direction of rotation of the vehicle wheels 11. Figs. 2 and 3 illustrate two different methods for accomplishing this purpose.

In Fig. 2, a reversing switch device 81 in the form of a conventional polarized relay has the terminals of the magnet winding 82 thereof connected across the output wires 71 and 72, or the brush terminals 61 and 62, of the generator 21 shown in Fig. 1. The reversing switch 81 has two insulated contact fingers 83 and 84 to which the wires 71 and 72 are respectively connected. Associated with each of the contact fingers are a pair of stationary spaced contact members 86 and 87.

The contact member 86 of the contact finger 83 and the contact member 87 of the contact finger 84 are connected by a wire 88 to one terminal of the primary winding 67 of the transformer 22. The contact member 87 of contact finger 83 and the contact member 86 of the contact finger 84 are connected by a common wire 89 to the other terminal of the primary winding 67 of the transformer 22.

In operation, assuming the polarity of the brush terminal 61 to be positive and that of the brush terminal 62 to be negative, the contact fingers 83 and 84 of the reversing switch 81 are actuated to the position shown. Thus current will flow from the brush terminal 61 by way of the wire 71, contact finger 83, wire 88, primary winding 67 of the transformer 22, wire 89, contact finger 84, and wire 72 to the brush terminal 62.

If, now, the wheel with which the generator 21 is associated, begins to slip, the voltage impressed upon the primary winding 67 reduces at a sufficient rate that current is induced into the secondary winding 68 in the proper direction to actuate the contact member 75 of the relay 23 to its circuit-closing position.

If the direction of vehicle travel and therefore rotation of the wheels 11 is reversed so that the polarity of the brush terminal 62 is positive and that of the brush terminal 61 is negative, the contact fingers 83 and 84 of the reversing switch 81 will be shifted automatically from the position shown to the opposite position in which the contact finger 83 engages its contact member 87 and the contact finger 84 engages its associated contact member 87. The flow of current in the circuit which occurs in response to slipping of the wheels 11 may now be traced from the brush terminal 62, through the wire 72, contact finger 84, wire 88, primary winding 67, wire 89, contact finger 83, wire 71 to the brush terminal 61.

It will be observed that the direction of flow of current through the primary winding 67 is in the same direction as previously. Thus the voltage induced in the secondary winding 68 is of the same polarity as previously, so the relay 23 will be operatively energized and the contact member 75 thereof shifted to its circuit-closed position.

It will be apparent, upon analysis, that in the arrangement shown in Fig. 2, the relay 23 is not operatively energized upon acceleration of the slipping vehicle wheels back toward a speed corresponding to vehicle speed, just as in the arrangement shown in Fig. 1. This is so because the polarity of the voltage induced in the secondary winding 68 of the transformer 22 is reversed during acceleration of the wheels without reversal of the polarity at the brush terminals 61 and 62 of generator 21.

In Fig. 3 another arrangement is shown for effecting the unidirectional flow of operating current through the magnet winding of the relay 23, which arrangement includes a reversing switch 81 of the polarized type corresponding identically to the reversing switch 81 of Fig. 2. The arrangement in Fig. 3 differs from that in Fig. 2 in that the contact fingers 83 and 84 of the switch 81 serve to reverse the connections between the terminals of the secondary winding 68 of transformer 22 and the terminals of the magnet winding of the relay 23. The magnet winding 82 of the switch 81 in Fig. 3 is, furthermore, in series-circuit relation with the primary winding 67 of the transformer 22 instead of in parallel relation as in Fig. 2.

As in Fig. 2, the magnet winding 82 of the switch 81 in Fig. 3 is energized by a flow of current in one direction for one polarity of the brush terminals 61 and 62 of the generator and energized by a flow of current in the opposite direction for the opposite polarity of the brush terminals 61 and 62. The contact fingers 83 and 84 of the switch 81 are correspondingly shifted to one position or the other depending upon the polarity of the terminals 61 and 62 of the generator 21. It is deemed unnecessary to trace the circuit connections between the secondary winding 68 and the magnet winding of the relay 23 because the circuit for each position of the contact fingers of the switch 81 will be readily apparent. In each position of the contact fingers of the switch 81 in Fig. 3, the direction of flow of current through the magnet winding of the relay 23 is thus always in the same direction during deceleration of a slipping wheel. Also, for the same reason given above in connection with Figs.

1 and 2, relay 23 is not operated during acceleration of the slipping wheels back toward a speed corresponding to vehicle speed.

Fig. 4

Referring to Fig. 4, a further modification of the electrical apparatus shown in Fig. 1 for detecting the slipping of the vehicle wheels is shown. This apparatus differs from that shown in Fig. 3 in providing a transformer 22a differing slightly from the transformer 22 and in providing a reversing switch 81a of the polarized type differing from switch 81 in having only one contact finger 83a instead of the two contact fingers 83 and 84.

The primary winding 67a of the transformer 22a and the magnet winding 82a of the reversing switch 81a are connected in series circuit relation with the generator 21 in a manner similar to the arrangement in Fig. 3.

The transformer 22a differs from the transformer 22 in that the secondary winding 68a thereof is provided with a middle tap connection 91 to which one terminal of the magnet winding of the relay 23 is connected by a wire 92. The opposite terminal of the magnet winding of the relay 23 is connected by a wire 94 to the contact finger 83a of the switch 81a. One end terminal of the transformer secondary winding 68a is connected by the wire 73 to stationary contact member 86 associated with the contact member 83a while the opposite end terminal of the secondary winding 68a is connected by the wire 74 to the stationary contact member 87 associated with the contact finger 83a.

In operation, if the brush terminals 61 and 62 are of positive and negative polarity respectively, current flows through the primary winding 67a of the transformer 22a in the right-hand direction and the contact finger 83a of the reversing switch 81a correspondingly engages contact member 86, as shown.

If the wheels slip, a voltage is correspondingly induced in the secondary winding 68a in a direction to oppose the change of magnetic flux cutting the secondary winding. Let it be assumed that the polarity of the induced voltage is such that the current flows from the tap connection 91 of the secondary winding 68a through wire 92, magnet winding of the relay 23, wire 94, contact finger 83a, wire 73 and the left-hand portion of the secondary winding 68a back to the tap connection 91. Relay 23 is accordingly operatively energized and the contact member 75 thereof actuated to circuit-closed position.

If, now, the polarity of the brush terminals 61 and 62 is reversed due to a reversal of direction of rotation of the vehicle wheels, the current flows through the primary winding 67a in the left-hand direction and the contact finger 83a of the reversing switch 81a is correspondingly shifted to the opposite position engaging contact member 87.

Due to the reversal of current in the primary winding 67a, the polarity of the voltage induced in the secondary winding in response to slipping of the vehicle wheels is likewise reversed and thus the current flows from the tap connection 91 of the secondary winding 68a through wire 92, magnet winding of the relay 23, wire 94, contact finger 83a, wire 74, and the right-hand portion of the secondary winding 68a back to the tap connection 91.

Thus notwithstanding a reversal of polarity of the generator brush terminals 61 and 62 due to a reversal of rotation of the vehicle wheels, current is always supplied in the proper direction through the magnet winding of the relay 23, upon a slipping of the vehicle wheels. The contact member 75 of the relay 23 is, therefore, always actuated to circuit-closed position when the wheels decelerate, while slipping, but not when the wheels accelerate.

Figs. 5 and 6

Referring to Figs. 5 and 6, arrangements are shown respectively therein whereby the reversing switch associated with one wheel-and-axle unit of a car may be adapted to control the circuit connections to the relays 23 of a plurality of wheel-and-axle units. Each of the generators 21 shown in Fig. 5 is associated with a different wheel pair on the car and, assuming that each wheel truck of a two truck railway car is provided with two pairs of wheels, the equipment shown in Fig. 5 illustrates the manner of application in the control of the entire car equipment.

In Fig. 5 the electrical wheel-slip detecting apparatus associated with each wheel-and-axle unit is illustrated as of the type shown in Fig. 4. It will be understood, however, that any of the various other circuit arrangements previously or subsequently described may be similarly adapted.

Referring to Fig. 5 it will be seen that the generator circuit for only one axle unit contains a reversing switch 81b of the polarized type. The switch 81b differs from the switch 81a in that it has four insulated contact fingers 83b instead of but one contact finger 83a.

Each of the contact fingers 83b of the switch 81b is arranged to control the connection between the transformer secondary winding 68a in a particular axle circuit to the corresponding relay 23 in the same manner previously described in Fig. 4.

The arrangement shown in Fig. 6 differs from that shown in Fig. 5 in having a reversing switch 81c of the polarized type. The switch 81c differs from the switch 81b in that, in place of one magnet winding 82b, it has four magnet windings 82c each of which is included in series relation in the circuit of a corresponding generator or axle circuit. The switch 81c has four contact fingers 83b which control the connections between the secondary winding 68a of the transformer 22a associated with each axle unit and the corresponding relay 23, in the same manner as in Fig. 5.

The advantage of the arrangement shown in Fig. 6 over that in Fig. 5 is that failure of the reversing switch 81c to operate to the proper position corresponding to the direction of travel of the vehicle or car is rendered unlikely because, if one of the generator circuits is interrupted or fails accidentally, the magnet windings of the switch 81c connected in the other generator circuits will still effect the proper operation of the switch.

Figs. 7 and 8

Referring to Fig. 7, a further modification of the electrical apparatus for detecting the slipping of the vehicle wheels is diagrammatically shown. The arrangement differs from that in Fig. 1 in having a relay 23a of a polarized type instead of the relay 23, in omitting the transformer 22, and in providing a non-inductive resistor 96, an inductance coil or reactor 97, and a rheostat 98.

The relay 23a differs from the relay 23 in having, in place of but one winding, two windings 101 and 102 so arranged as to be energized in bucking or opposing relation, as indicated by the arrows. The contact member 75 of the relay 23a is normally biased to a circuit-open position and is actuated to its circuit-closed position only when the current in the coil 102 is flowing in the proper direction and exceeds the current in the coil 101 by a predetermined amount.

The two coils 101 and 102 of the relay 23a are respectively connected in two different parallel branches of the generator circuit, one branch of the circuit including the coil 101 and the resistor 96 and the other branch of the circuit including the coil 102 and the reactor 97. The parallel branches containing coils 101 and 102 are connected in the simple circuit shown so as to be subject to the voltage across the terminals 61 and 62 of the generator 21 as adjusted by the rheostat 98.

In operation, if the wheels decelerate in normal manner without slipping during an application of the brakes, the magnetic forces exerted by the two coils 101 and 102 are sufficiently closely balanced so that contact member 75 is not actuated out of its normal circuit-open position.

If the wheel or wheels with which the generator 21 is associated begin to slip, however, the current in the coil 101 is correspondingly rapidly reduced in response to the reduction of voltage across the terminals of the generator while, due to the reactor 97 in the branch circuit having the coil 102, the variation of the current in the coil 102 in response to the reduction of voltage across the terminals of the generator is inhibited or delayed and thus, momentarily, the coil 102 exerts a higher magnetic force than the coil 101 which results in the actuation of the contact member 75 to its circuit-closed position.

When the slipping wheel is accelerating back toward a speed corresponding to vehicle speed due to the release of the brakes caused by operation of the relay 23a, reactor 97 inhibits the increase of current in coil 102 relative to the increase of current in coil 101. Thus in this case, coil 101 exerts a higher magnetic force than coil 102 momentarily, and contact 75 is not actuated to its circuit-closed position.

The arrangement shown in Fig. 7 is adapted for uni-directional travel of the vehicle only. It is desirable, therefore, to provide a reversing switch or relay 105 of the polarized type in the circuit of the generator 21, as indicated in Fig. 8, for maintaining uni-directional flow of current through the coils 101 and 102 of the relay 23a notwithstanding reversal of the direction of rotation of the wheels and reversal of the direction of travel of the car. The switch 105 is identical in construction to the relay 81 previously described in connection with Fig. 2 and accordingly needs no description either as to its construction or the character of its operation.

*Fig. 9*

Referring to Fig. 9, a modified embodiment is shown wherein the two generators 21 associated with the two axles of a two-axle railway car truck are connected in bucking or opposing relation in a series circuit including a relay 23b which in turn controls selectively the magnet winding 42 of two magnet valve devices 19 associated respectively with the different axles.

The relay 23b is of the so-called polarized-neutral type having a magnet winding connected in the circuit of the two generators 21 and having a so-called polar contact member 75b and a neutral contact member 75c.

The polar contact member 75b is biased to its left-hand position, as shown, when the current flows through the magnet winding of the relay in one direction and is actuated in the right-hand direction to the opposite position when the current flows through the magnet winding of the relay in the opposite direction.

The neutral contact 75c is always actuated from a circuit-open position to a circuit-closed position in response to a flow of current through the magnet winding in either direction.

The neutral contact member 75c is effective, when actuated to its closed position, to connect the contact member 75b to the positive terminal of a battery 108, the negative terminal of which is grounded. When the contact member 75b is in its left-hand position, its completes the simple circuit shown for energizing the magnet winding 42 of the left-hand magnet valve device 19, the right-hand magnet valve device 19 being at this time deenergized.

When the contact member 75b is in its right-hand position, the circuit for energizing the magnet winding of the right-hand magnet valve device 19 is completed and the magnet winding of the left-hand magnet valve device 19 is deenergized.

In operation, when the voltage across the brush terminals 61 and 62 of one of the generators 21 reduces rapidly in response to the slipping of the wheels associated therewith, the higher voltage of the other generator produces a flow of current in the circuit which is in such a direction as to cause the polar contact member 75b of the relay 23b to be actuated to the proper position for energizing the magnet winding 42 of the magnet valve device associated with and controlling the brake cylinder for the slipping wheel.

It will be understood that the arrangement of the magnet valve device 19, brake release valve device 18, brake cylinder 13, and control pipe 16 is exactly as previously described in Fig. 1 and need not be repeated here.

It should be understood that the relay 23b is a conventional type of relay in which the neutral and the polar contacts are in series relation to insure interruption of the circuit on deenergization of the relay. Obviously, in Fig. 9 it is necessary that the circuits of the magnet windings of the magnet valve devices 19 be interrupted when slipping of the car wheels ceases. If only the polar contact member 75b were employed, the circuits would not be interrupted until the direction of current flow through the relay magnet winding was reversed. The neutral contact member 75c therefore insures interruption of the magnet winding circuits when either of the wheel-and-axle units ceases to slip.

When the magnet winding of the relay 23b is energized by the flow of current in the circuit of the two generators 21, the polar contact member 75b is always operated to the correct position corresponding to the direction of flow current before the neutral contact member 75c reaches its closed position. This prevents the undesired energization of the magnet winding for the magnet valve device 19 opposite to that of the wheel-and-axle unit which is slipping, which result might occur if the neutral contact member 75c were actuated to its closed position before the polar contact member 75b is properly positioned.

It should be apparent that if neither of the wheel-and-axle units of the car truck shown in Fig. 9 are slipping, the voltages across the brush terminals of the two generators 21 are exactly equal and opposite and consequently no current flows in the circuit. The neutral contact member 75c of the relay 23b is, therefore, in open position and neither of the magnet windings 42 of the magnet valve devices 19 for the respective wheel-and-axle units is energized. When slipping of the wheels on either of the axles occurs, the relay 23b automatically operates to select the proper magnet valve device 19 corresponding to the slipping wheel-and-axle units.

As shown, the equipment in Fig. 9 is adapted for travel of the car in one direction only. If it is desired to employ this equipment on cars adapted to travel in either direction, it will be necessary to provide a reversing switch or relay, similar to the reversing switches 81 and 105 previously described, for reversing the terminal connections of the magnet winding of the relay 23b in the circuit upon a change in direction of travel of the vehicle.

*Fig. 10*

In all the previous embodiments above described, the generators 21 associated with the car wheels have been of the direct-current type. In Fig. 10, an arrangement is shown employing a generator 111 of the alternating-current type, as distinguished from the direct-current type. The arrangement shown in Fig. 10 is similar to that shown in Fig. 1 in that a relay 23 of the polarized type is provided and has the magnet winding thereof subject to the voltage across the terminal of the secondary winding 68 of the transformer 22.

The circuit connection to the primary winding 67 of the transformer 22 in Fig. 10, differs from that previously described for Fig. 1 in that the primary winding is connected across the output terminals of a full-wave rectifier 112, indicated as of the dry-disk or copper-oxide type, the alternating-current terminals of the rectifier 112 being connected, in the manner shown, across the brush terminals of the alternating-current generator 111.

In the wire connecting one brush terminal of the generator 111 to one of the alternating-current terminals of the rectifier 112 is an inductance coil or reactor 113. The reactor 113 is provided in order to cause the direct-current output voltage of the rectifier 112 to vary in substantial proportionality to the variation of the alternating-current voltage impressed on the alternating-current terminals of the rectifier. As is well known, the copper-oxide rectifier has the characteristic that the direct-current voltage output of the rectifier varies more rapidly than the alternating-current voltage input to the rectifier when the input voltage is varied through a wide range such as would be the case in the type of apparatus described.

The reactance of the reactor 113 is directly proportional to the frequency of the voltage at the terminals of the generator 111 while the resistance of the rectifier and its load to the alternating-current is on the other hand higher at the lower speeds. At higher speeds, therefore, the reactor 113 absorbs a material part of the voltage delivered by the generator 111 while at lower speeds practically the full output voltage of the generator is impressed on the rectifier. By properly proportioning the reactance of the reactor 113 very good compensation for speed variation can be obtained. In practice, the armature winding of the generator may be so designed so that the reactance of the armature winding itself will suffice to provide the necessary compensation, in which case no external reactor would be needed.

A condenser 114 is provided across the direct-current output terminals of the rectifier 112 in order to smooth out the ripple in the direct-current output of the rectifier.

In operation, it will be seen that whenever the car wheel with which the generator 111 begins to slip, the direct-current voltage output of the rectifier 112 proportionally reflects the variation of the alternating-current voltage output of the generator, and thus a voltage is correspondingly induced in the secondary winding 68 of the transformer 22 just as in the first embodiment shown in Fig. 1.

It will be apparent that the apparatus shown in Fig. 10 is adapted to function for either direction of travel of the car because, regardless of the direction of rotation of the car wheel, the direct-current terminals of the rectifier 112 are always of the same polarity and consequently the direction of flow of current induced in the secondary winding 68 of the transformer 22 upon deceleration of the wheels is always in the same direction regardless of the direction of travel of the car.

*Summary*

Summarizing, it will be seen that I have disclosed vehicle brake control apparatus including a plurality of different types of electrical devices for detecting or registering the rate of rotative deceleration of a vehicle wheel for the purpose of controlling the brakes. In the embodiments shown, the electrical apparatus for recognizing the rate of rotative deceleration is adapted to function to cause automatic and rapid release of the brakes associated with a slipping wheel so as to cause the wheel to cease to decelerate and begin to accelerate back toward its speed corresponding to vehicle speed without actually attaining a locked or sliding state.

Several of the embodiments employ a transformer having a primary winding energized according to the output voltage of a direct-current axle-driven generator and having the secondary winding connected to a control relay of the polarized type highly sensitive to variation of current. As long as the vehicle wheel travels at a constant rate of rotation or speed or as long as the rate of rotative deceleration of the wheel does not exceed a normal rate the voltage induced in the secondary winding of the transformer is insufficient to cause operation of the control relay. When a wheel slips, however, the rate of change of voltage impressed upon the primary winding is such that the voltage induced in the secondary winding is sufficient to cause operation of the control relay and instant release of the brakes.

Certain of the embodiments employ reversing switches or relays of the polarized type for reversing the terminal connections of the primary winding and of the secondary winding of the transformer so as to insure uni-directional flow of current through the control relay, during rotative deceleration of the vehicle wheels, notwithstanding reversal of the direction of travel of the vehicle.

Several of the modified arrangements shown include a transformer wherein the secondary winding has a tap connection and a reversing switch or relay which connects the control relay across the tap connection and one or the other of the opposite ends of the secondary winding, depending upon the direction of travel of the vehicle, so as to cause uni-directional flow of current through the winding of the control relay during deceleration of the wheels.

Several arrangements are shown wherein a reversing switch or relay associated with one of a plurality of wheel-and-axle units controls the relay circuits for a plurality of axle units.

A further modified arrangement includes a polar control relay having two opposing windings, each subject to the output voltage of a direct-current axle-driven generator, one of the windings having a non-inductive resistance and the other having an inductive reactance in series relation therewith. In this arrangement, when the wheel slips, the reactance causes the variation of current in the associated coil in response to slipping of the wheel to lag that in the other coil, thus causing operation of the relay to effect release of the brakes.

Another arrangement is shown including a reversing switch or relay adapted to the type of equipment last described.

Another embodiment is shown wherein the two axle-driven generators of a two-axle car truck are connected in a loop circuit in opposition to each other with a relay of the polarized-neutral type effective in response to the direction of flow of current in the loop circuit for selectively effecting the release of the brakes only on the wheels of the particular axle having slipping wheels.

A still further embodiment is shown wherein an axle-driven generator of the alternating-current type, as distinguished from the direct-current type, is provided together with a full-wave rectifier of the copper-oxide type having its alternating-current terminals subject to the voltage of the alternating-current generator, the direct-current output terminals of the rectifier being connected to the primary winding of the transformer. In this type of equipment no reversing switch is required to effect proper operation for both directions of travel of the vehicle because the rectifier always has the same direct-current polarity.

While I have shown and described only certain specific embodiments or modifications of my invention, it will be apparent that various omissions, additions or modifications may be made therein without departing from the spirit of my invention. It is accordingly not my intention to limit the scope of my invention except as it is necessitated by the scope of the prior art.

Having now described my invention, what I claim as new and desire to secure by Letters Patent, is:

1. Vehicle wheel brake control apparatus of the type for preventing the sliding of the wheels comprising, in combination, means under the control of the operator for controlling the application and release of the brakes associated with a vehicle wheel, a direct-current generator adapted to supply a voltage corresponding substantially to the rotative speed of the vehicle wheel, voltage translating means having a primary winding on which the generator voltage is impressed and a secondary winding in which a voltage is induced proportional to the rate of change of voltage impressed on the primary winding and of opposite polarity depending upon whether the generator voltage is increasing or decreasing, electroresponsive means on which the voltage induced in the said secondary winding is impressed and operatively responsive only to a voltage of that polarity occurring when the vehicle wheel decelerates and in excess of a certain value occurring only when the vehicle wheel decelerates at a slipping rate, and brake control means effective during an application of the brakes in response to the operation of the electroresponsive device for effecting a rapid release of the brakes on the wheel independently of the operator controlled means so as to prevent sliding of the wheel.

2. Vehicle wheel brake control apparatus of the type for preventing the sliding of the wheels comprising, in combination, means under the control of the operator for effecting application and release of the brakes associated with the vehicle wheels, a direct-current generator adapted to supply a voltage corresponding substantially to the rotative speed of a vehicle wheel and of opposite polarity for opposite directions of rotation of the wheel, voltage translating means having a primary winding on which the generator voltage is impressed and a secondary winding in which a voltage is induced proportional to the rate of change of voltage impressed on the primary winding and of opposite polarity depending upon whether the generator voltage is increasing or decreasing, an electroresponsive device subject to the voltage induced in the said secondary winding and operatively responsive only to a voltage in excess of a certain value occurring only while the vehicle wheel slips and of one certain polarity, means controlled according to the polarity of the generator voltage for causing a voltage of said one certain polarity to be induced in the said secondary winding whenever the generator voltage decreases notwithstanding a reversal of polarity of the generator voltage, and brake control means effective during an application of the brakes in response to operation of the electroresponsive device for effecting a rapid release of the brakes on the wheel independently of the operator-controlled means for preventing sliding of the wheel.

3. Brake control apparatus for a pair of separately rotatable elements having separate brake means associated respectively therewith comprising, in combination, a direct-current generator for each of said rotary elements adapted to supply a voltage substantially proportional to the speed of rotation of the corresponding rotary element, a loop circuit in which said generators are arranged in opposing relation so that current flows in said circuit in one direction or the other whenever the voltage of one generator exceeds the voltage of the other, a relay of the polarized type operative to one position when the current flows in said circuit in one direction and operative to another position when the current flows in said circuit in the opposite direction, and means controlled according to the position of the said relay for selectively controlling the operation of the brake means associated with the one or the other of said pair of rotatable elements.

4. Vehicle wheel brake control apparatus for a vehicle having at least two separately rotatable wheels comprising, in combination, brake means for each of said wheels, means under the control of an operator for effecting application and release of the brake means associated with the wheels, a direct-current generator for each of said wheels adapted to supply a voltage substantially proportional to the rotative speed of the wheel, a loop circuit in which the two generators are arranged in opposing relation so that, when one of the wheels slips, current flows in said circuit in one direction and, when the other of said wheels slips, current flows in said circuit in the opposite direction, a relay of the polarized type operative to one position in response to the flow of current in said circuit in one direction and operative to a second position in response to the flow of current in said circuit in the opposite direction, and means for each of said wheels selectively controlled according to the position of said relay so as to effect the release of the brakes on only the particular wheel that slips.

5. Vehicle wheel brake control apparatus for a vehicle having at least two separately rotatable wheels comprising, in combination, brake means for each of said wheels, means under the control of an operator for effecting application and release of the brake means associated with the wheels, a direct-current generator for each of said wheels adapted to supply a voltage substantially proportional to the rotative speed of the wheel, a loop circuit in which the two generators are arranged in opposing relation so that, when one of the wheels slips, current flows in said circuit in one direction and, when the other of said wheels slips, current flows in said circuit in the opposite direction, a relay of the polarized-neutral type having a polar contact member operative to one position in response to the flow of current in said circuit in one direction and operative to a second position in response to the flow of current in the opposite direction and having a neutral contact member that is operative from a circuit-open to a circuit-closed position whenever a predetermined current flows in either direction in said circuit, electroresponsive means for each of said wheels effective when energized to initiate the rapid release of the brakes on the corresponding wheel independently of the operator-controlled means, said polar contact member and said neutral contact member of the relay being jointly effective to selectively control energization of only the electroresponsive means for the particular wheel that slips.

6. Brake control apparatus for the brakes associated with a vehicle wheel comprising, in combination, means adapted to supply a voltage substantially proportional to the rotative speed of the vehicle wheel, means effective to supply a voltage proportional to the rate of change of voltage delivered by the first said means and of opposite polarity depending upon whether the voltage delivered by the first said means increases or decreases, electroresponsive means subject to the voltage supplied by the last said means and operatively responsive only to a voltage in excess of a certain value and of the polarity corresponding to a decrease of the voltage supplied by the first said means, and brake control means controlled by the said electroresponsive means.

7. Brake control apparatus for the brakes associated with a vehicle wheel comprising, in combination, a generator adapted to supply a voltage substantially proportional to the rotative speed of the vehicle wheel, voltage-translating means having a primary winding subject to a voltage corresponding to that supplied by said generator and a secondary winding in which a voltage proportional to the rate of change of voltage impressed on the primary winding is induced, a relay of the polarized type subject to the voltage induced in said secondary winding and operatively responsive only to a voltage of one certain polarity and in excess of a certain value resulting only when the vehicle wheel decelerates at a slipping rate, and brake control means controlled by said relay.

8. Brake control apparatus for the brakes associated with a vehicle wheel comprising, in combination, a generator adapted to supply a voltage substantially proportional to the rotative speed of the vehicle wheel, voltage-translating means having a primary winding subject to a voltage corresponding to that supplied by said generator and a secondary winding in which the voltage of one polarity is induced in response to a decrease of the voltage impressed on the primary winding and in which a voltage of the opposite polarity is induced in response to an increase of the voltage impressed on the primary winding, a relay of the polarized type subject to the voltage induced in the secondary winding and operatively responsive only to a voltage in excess of a certain value and of said one polarity occurring only when the vehicle wheel decelerates at a slipping rate, and brake control means controlled by said relay.

9. Brake control apparatus for the brakes associated with a vehicle wheel comprising, in combination, means adapted to supply a voltage substantially proportional to the rotative speed of the vehicle wheel and of opposite polarity depending upon the direction of rotation of said wheel, other means effective to supply a voltage proportional to the rate of change of voltage delivered by the first said means and of corresponding polarity, means for causing the said other means to deliver a voltage of the same polarity, notwithstanding a reversal of polarity of the voltage delivered by the first said means, whenever the speed of the vehicle wheel decreases and for causing the said other means to deliver a voltage of the opposite polarity, notwithstanding a reversal of polarity of the voltage delivered by the first said means, whenever the speed of the vehicle wheel increases, electro-responsive means controlled according to the voltage supplied by said other means, and brake control means controlled by said electroresponsive means.

10. Brake control apparatus for the brakes associated with a vehicle wheel comprising, in combination, means adapted to supply a voltage substantially proportional to the rotative speed of the vehicle wheel and of opposite polarity depending upon the direction of rotation of the wheel, other means effective to supply a voltage proportional to the rate of change of voltage supplied by the first said means, means for causing the said other means to supply a voltage of one certain polarity, notwithstanding a reversal of polarity of the voltage supplied by the first said means, whenever the speed of the vehicle wheel decreases and for causing said other means to supply a voltage of a polarity opposite to said one certain polarity, notwithstanding a reversal of polarity of the voltage supplied by the first said means, whenever the speed of the vehicle wheel increases, a relay of the polarized type on which the voltage supplied by said other means is impressed and which is operatively responsive only to a voltage in excess of a certain value and of said one certain polarity occurring only when the wheel decelerates at a slipping rate, and brake control means controlled by said relay.

11. Brake control apparatus for the brakes associated with a vehicle wheel comprising, in combination, a generator adapted to supply a voltage substantially proportional to the rotative speed of the vehicle wheel, voltage-translating means having a primary winding subject to a voltage corresponding to that supplied by said generator and a secondary winding in which a voltage proportional to the rate of change of the voltage impressed on the primary winding is induced, an electroresponsive device subject to the voltage induced in said secondary winding and operatively responsive only to a voltage of one certain polarity in excess of a certain value, means interposed between said generator and the primary winding of the voltage-translating means for causing a voltage of the said one certain polarity to be induced in the secondary winding of the translating means upon a reduction of generator voltage notwithstanding a reversal of polarity of the generator voltage, and brake control means controlled by said electroresponsive device.

12. Brake control apparatus for the brakes associated on a vehicle wheel, comprising, in combination, a direct-current generator adapted to supply a voltage substantially proportional to the rotative speed of the wheel and of opposite polarity for opposite directions of rotation of the wheel, voltage-translating means having a primary winding on which the voltage supplied by said generator is impressed and a secondary winding in which a voltage is induced proportional to the rate of change of voltage impressed on the primary winding, a reversing switch controlled according to the polarity of the voltage supplied by said generator effective automatically to cause a voltage of one certain polarity to be induced in the secondary winding upon a reduction of the voltage supplied by said generator notwithstanding a reversal of polarity of the generator voltage due to a reversal of the direction of rotation of the wheel, an electroresponsive device on which the voltage induced in the secondary winding is impressed and operatively responsive only to a voltage in excess of a certain value and of said one certain polarity, and brake control means controlled by said electroresponsive device.

13. Brake control apparatus for the brakes associated with a vehicle wheel, comprising, in combination, a direct-current generator adapted to supply a voltage substantially proportional to the rotative speed of the wheel and of opposite polarity for opposite directions of rotation of the wheel, voltage-translating means having a primary winding and a secondary winding, a reversing switch device automatically effective in accordance with the polarity of the voltage supplied by the generator to so control the connections of the primary winding to the generator as to cause a flow of current through the primary winding in the same direction notwithstanding a reversal of polarity of voltage supplied by the generator, an electroresponsive device energized in accordance with the voltage induced in the secondary winding in response to a change in the generator voltage impressed on the primary winding, and brake control means controlled by said electroresponsive device.

14. Brake controlling apparatus for controlling the brakes associated with a vehicle wheel comprising, in combination, a direct-current generator adapted to supply a voltage substantially proportional to the rotative speed of the wheel and of opposite polarity for opposite directions of rotation of the wheel, voltage-translating means having a primary winding on which the generator voltage is impressed and a secondary winding in which a voltage proportional to the rate of change of the voltage impressed on the primary winding is induced, an electroresponsive device on which the voltage induced in said secondary winding is impressed and which is operatively responsive only to a voltage of one certain polarity in excess of a certain value, a reversing switch device controlled according to the polarity of the generator voltage and automatically effective to so control the connections between the secondary winding and the said electroresponsive device as to cause a voltage of said one certain polarity to be impressed on the said electroresponsive device upon a reduction of the generator voltage notwithstanding a reversal of polarity of the generator voltage, and brake control means controlled by said electroresponsive device.

15. Brake control apparatus for the brakes associated with a vehicle wheel, comprising, in combination, a direct-current generator adapted to supply a voltage substantially proportional to the rotative speed of the vehicle wheel and of opposite polarity for opposite directions of rotation of the vehicle wheel, voltage-translating means having a primary winding on which the generator voltage is impressed and a secondary winding in which a voltage proportional to the rate of change of voltage impressed on the primary winding is induced, an electroresponsive device operatively responsive only to a voltage of one certain polarity in excess of a certain value, a reversing switch device automatically effective according to the polarity of the generator voltage for connecting said device selectively across different portions of the secondary winding at different times so as to always cause the said device to have a voltage of said one polarity impressed thereon upon a reduction of generator voltage notwithstanding a reversal of polarity of the generator voltage, and brake control means controlled by said electroresponsive device.

16. In a brake control apparatus for controlling the brakes associated with a plurality of separately rotatable vehicle wheels, the combination of individual electroresponsive means for each of said vehicle wheels, each of said electroresponsive means being operatively responsive only to a current in one certain direction and in excess of a certain value, means associated with each of said vehicle wheels for causing a current in excess of said certain value to flow through the corresponding electroresponsive means when the corresponding vehicle wheel rotatively decelerates or accelerates at a rate in excess of a certain rate, means controlled according to the direction of rotation of a certain one of said vehicle wheels for causing the current to flow through all of said electroresponsive means in the said one certain direction only when the vehicle wheels rotatively decelerate, and brake control means controlled by said electroresponsive means.

17. In a brake control apparatus for the brakes associated with a plurality of separately rotatable vehicle wheels, the combination of an individual direct-current generator for each of said wheels adapted to supply a voltage corresponding substantially to the rotary speed of the corresponding wheel and of opposite polarity depending upon the direction of rotation of the wheel, voltage-translating means for each of said wheels having a primary winding on which the corresponding generator voltage is impressed and a secondary winding in which a voltage proportional to the rate of change of the voltage impressed on the primary winding is induced, an electroresponsive device for each of said wheels on which the voltage induced in the secondary winding of the corresponding translating means is impressed and which is operatively responsive only to a voltage of one certain polarity in excess of a certain value, a reversing switch device automatically controlled according to the polarity of the voltage supplied by a certain one of said generators for controlling the connections between each of said devices and the corresponding secondary winding so as to cause a voltage of the said one certain polarity to be impressed on the device upon a reduction of the corresponding generator voltage notwithstanding a reversal of polarity of the corresponding generator voltage, and brake control means controlled by said electroresponsive devices.

18. In a brake control apparatus for the brakes associated with a plurality of separately rotatable vehicle wheels the combination of an individual direct-current generator for each of said wheels adapted to supply a voltage corresponding substantially to the rotary speed of the corresponding wheel and of opposite polarity depending upon the direction of rotation of the wheel, voltage-translating means for each of said wheels having a primary winding on which the voltage of the corresponding generator is impressed and a secondary winding in which a voltage proportional to the rate of change of voltage impressed on the primary winding is induced, an electroresponsive device for each of said wheels on which the voltage induced in the secondary winding of the corresponding translating means impressed and operatively responsive only to a voltage of one certain polarity in excess of a certain value, an electroresponsive switch device of the polarized type having a plurality of electroresponsive windings each of which is energized respectively according to the polarity of the voltage supplied by a corresponding one of said generators, said reversing switch device being effective to so control the connections between each of said electroresponsive devices and the secondary winding of the corresponding translating means as to cause a voltage of said one certain polarity to be impressed on the electroresponsive devices upon a reduction of the corresponding generator voltage notwithstanding a reversal of the polarity of the generator voltage, and brake control means controlled by said electroresponsive devices.

19. Brake control apparatus for controlling the brakes associated with a vehicle wheel comprising, in combination, means adapted to supply a voltage substantially proportional to the rotative speed of the vehicle wheel, a relay having two opposing electromagnet windings, each of which windings has the voltage delivered by said means impressed thereon, said relay being operative only when a predetermined degree of unbalance of current in said windings occur, and reactance means in the circuit of one of said windings effective to inhibit the variation of current in said one winding in response to a variation of the voltage delivered by the first said means and thereby to cause said predetermined degree of unbalance of current in said windings, and brake control means controlled by said relay.

20. Brake control apparatus for the brakes associated with a vehicle wheel comprising, in combination, a direct-current generator adapted to supply a voltage substantially proportional to the rotative speed of the wheel, a relay having two opposing electromagnet windings, each of which windings has the voltage delivered by the generator impressed thereon, said relay being operative only when the current in a certain one of said windings exceeds by at least a certain amount the current in the other of said windings, reactance means in the circuit of said certain one winding effective to so inhibit the reduction of current in said winding in response to a reduction of the generator voltage occurring when the wheel slips due to application of the brakes thereon as to cause the current in said winding to exceed the current in the said other winding by at least said certain amount, and brake control means controlled by said relay and effective in response to the operation of said relay to cause a rapid reduction in the degree of application of the brakes associated with said wheel.

21. Control apparatus for the brakes associated with a vehicle wheel comprising, in combination, means adapted to supply a voltage substantially proportional to the rotative speed of the vehicle wheel and of opposite polarity depending upon the direction of rotation of the wheel, a relay having two opposing electromagnet windings, each of which windings has impressed thereon the voltage supplied by said means, said relay being operative only when the energizing current in a certain one of said windings exceeds by at least a certain amount the current in the other of said windings, reactance means in the circuit of said certain one winding effective to so inhibit the reduction of current in said certain one winding in response to a reduction of the voltage delivered by said voltage-supply means when the vehicle wheel decelerates rotatively at a rate in excess of a certain rate as to cause the current in the said certain one winding to exceed by at least said certain amount the current in the other of said windings, means for causing the same direction of flow of current through said windings respectively notwithstanding a reversal of polarity of the voltage delivered by the said voltage-supply means, and brake control means effective in response to the operation of said relay for effecting a rapid reduction in the degree of application of the brakes.

22. In a brake control apparatus for the brakes associated with a vehicle wheel, the combination of an alternating-current generator adapted to deliver an effective voltage substantially proportional to the rotative speed of the vehicle wheel, a full-wave rectifier adapted to deliver a direct-current voltage of uniform polarity substantially proportional to the alternating-current voltage delivered by said generator, voltage-translating means having a primary winding on which the direct-current voltage delivered by the said rectifier is impressed and a secondary winding in which a voltage is induced proportional to the rate of change of voltage impressed on the primary winding, electroresponsive means on which the voltage induced in the secondary winding is impressed and operatively responsive thereto, and brake control means controlled by said electroresponsive means.

23. In a brake control apparatus for the brakes associated with a pair of separately rotatable vehicle wheels, the combination of individual means associated with each of said wheels respectively for supplying a voltage substantially proportional to the speed of rotation of the corresponding wheel, a loop circuit in which said voltage supply means are arranged in opposing relation so that the current flows in one direction or the other in said loop circuit depending upon which of the voltage supply means delivers the higher voltage, a relay of the polarized type operated to one position when the current flows in said circuit in one direction and operative to another position when the current flows in said circuit in the opposite direction, and brake control means for each of said wheels adapted to be selectively operated according to the position of said relay.

24. In a brake control apparatus for the brakes associated with a vehicle wheel, the combination of manually controlled means for effecting application and release of the brakes, a direct-current generator adapted to supply a voltage varying substantially in proportion to the rotative speed of the vehicle wheel and of opposite polarity for opposite directions of rotation thereof, a circuit, means adapted to cause a current to flow in one direction in said circuit varying in degree according to the rate of reduction of the voltage supplied by the said voltage supply means while the vehicle wheel rotates in one direction and adapted to cause a current to flow in said circuit in the opposite direction varying in degree according to the rate of reduction of the voltage supplied by said voltage supply means while the vehicle wheel is rotating in the opposite direction, means controlled according to the polarity of the voltage supplied by said voltage supply means for causing the current supplied by the last said means to flow in said circuit in only one certain direction upon a reduction of the voltage supplied by the voltage supply means notwithstanding a reversal of the direction of rotation of the vehicle wheel, electroresponsive means operating on said circuit and operatively responsive to a current in only the said one certain direction and in excess of a certain value, and brake control means effective upon operation of said electroresponsive means to effect a rapid reduction in the degree of application of the brakes independently of the manually operated means.

25. Vehicle wheel brake control apparatus of the type having means under the control of the operator for effecting application and release of the brakes associated with the vehicle wheels and additional control means for each of a plurality of wheel units respectively operative to effect a rapid reduction in the degree of application of the brakes associated with the corresponding wheel unit, the combination of means for each of said plurality of wheel units for supplying a direct-current voltage substantially proportional to the rotational speed of the corresponding wheel unit and of opposite polarity depending upon the direction of rotation of the wheel unit, means providing a circuit for each of said plurality of wheel units, means responsive to changes in the voltage supplied by each of the voltage supply means for causing a current to flow in the corresponding circuit in either direction when the wheel unit rotatively decelerates and in either direction when the wheel unit rotatively accelerates depending upon the direction of rotation of the wheel unit, means controlled according to the polarity of one of the voltage supply means for causing current to flow in all of said circuits in one certain direction whenever the wheel units decelerate notwithstanding a reversal of polarity of each of the voltage supply means with a reversal of direction of rotation of the corresponding wheel unit, and electroresponsive means in each of said circuits operatively responsive only to a current in said one certain direction and exceeding a certain value for effecting operation of the corresponding additional control means.

26. In a brake control apparatus for a vehicle having a plurality of separately rotatable wheel units and of the type having means under the control of the operator for effecting application and release of the brakes associated with all of said wheel units, and additional control means for each of a plurality of said wheel units respectively operative to effect a rapid reduction in the degree of application of the brakes associated with the corresponding wheel unit, the combination of an individual generator associated with each of the wheel units respectively for supplying a voltage substantially proportional to the rotational speed of the corresponding wheel unit, means providing a circuit for each of said wheel units respectively, means for each of said circuits effective upon changes in the voltage supplied by the corresponding generator for causing current to flow in the corresponding circuit proportional to the rate of change of the voltage of the generator, means controlled according to the direction of rotation of one certain one of said plurality of wheel units for causing current to flow in the several circuits in a certain one direction whenever the corresponding wheel unit decelerates notwithstanding a reversal of the polarity of the voltage of said generators with a reversal of direction of rotation of the corresponding wheel unit, and electroresponsive means in each of said circuits operatively responsive only to a current in the corresponding circuit in said one certain direction and in excess of a certain value for effecting operation of the corresponding additional control means.

ANDREW J. SORENSEN.